Jan. 17, 1956  C. W. NEWELL  2,730,833
LEADER HOLDER
Filed March 19, 1953
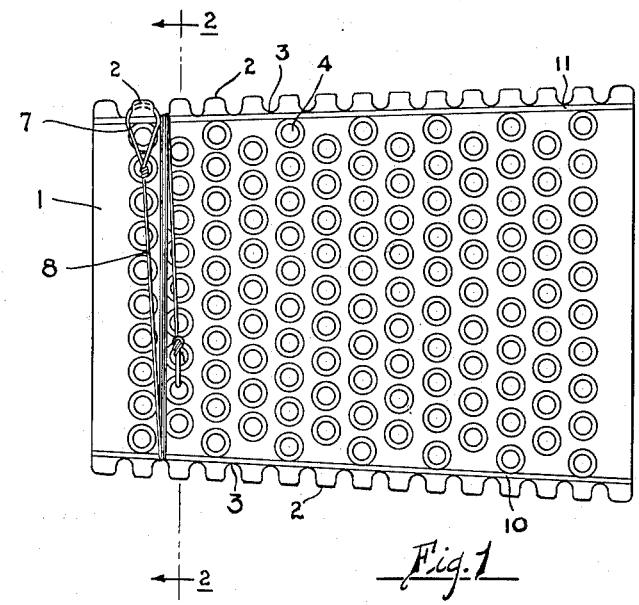
Fig. 1
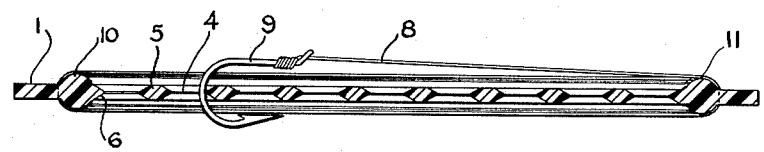
Fig. 2
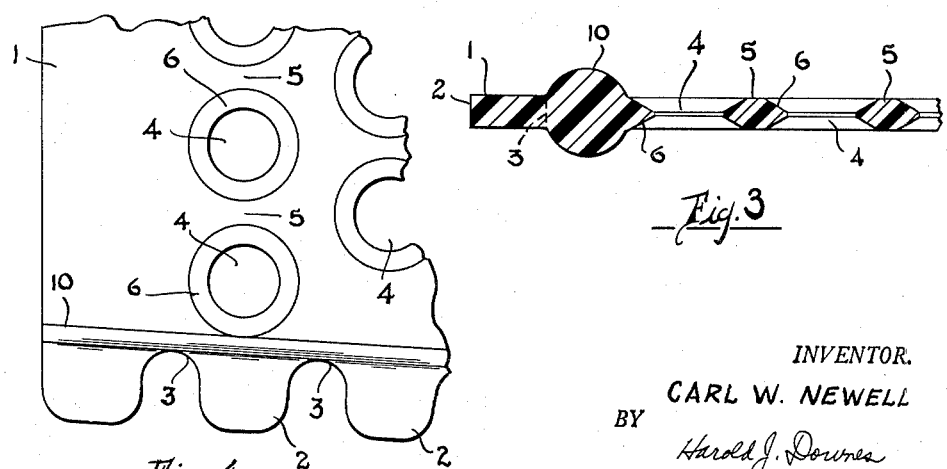
Fig. 3
Fig. 4
INVENTOR.
CARL W. NEWELL
BY Harold J. Downes
ATTORNEY

United States Patent Office 2,730,833
Patented Jan. 17, 1956

2,730,833

LEADER HOLDER

Carl W. Newell, Glendale, Calif.

Application March 19, 1953, Serial No. 343,380

3 Claims. (Cl. 43—57.5)

This invention pertains to fishing apparatus and particularly to a device for handling, storing and transporting fishing leaders.

Fishermen generally require a considerable number and variety of flies in different sizes and types and hooks of various kinds in fishing for a single variety of fish. These hooks and flies are normally attached to a length of gut known as a leader which has at its other end a permanently tied loop for securing the leader to the fishing line. Because of the presence of the hook and the fragile nature of the fly, these leaders with hooks attached are difficult to transport, store and handle. Furthermore, not only do they vary in size and character but the leaders themselves vary somewhat in length. This invention contemplates a convenient holder for storing and transporting leaders with hooks attached.

It is therefore an object of this invention to provide means for storing fish line leaders which means is adapted to prevent said leaders from becoming entangled.

It is another object of this invention to provide means for storing a plurality of hooked fish line leaders.

It is another object of this invention to provide means for storing and carrying a plurality of fish line leaders and hooks.

Other objects of invention will become apparent from the following description taken in connection with the accompanying drawings in which, Figure 1 is a plan view of the invention, Figure 2 is a sectional view of the invention taken at 2—2 in Figure 1, Figure 3 is a partial enlarged view of the device as shown in Figure 2, the hook and the leader being omitted, and Figure 4 is a fragmentary enlarged view of the device as shown in Figure 1.

Referring to the drawings there is shown a trapezoidal plate forming a holder 1 made preferably of Lucite, Plexiglas or some other transparent plastic material. The upper and lower non-parallel edges of holder 1 are of irregular contour incorporating simple projections 2 and indentations 3. These projections and indentations alternate so that the loop of the leader may be secured over projections. These edges may thus be said to be serrated and these serrations may, though they need not, be substantialy sinusoidal, and the alternate projections and indentations may be termed the peaks and valleys thereof. The interior portion of holder 1 is broken by a plurality of holes 4 shown in detail in Figures 3 and 4. These holes are of a diameter somewhat larger than the transverse dimension of the largest hook that it is desired to accommodate by use of the holder. Each hole is countersunk as shown at 5 and 6 in Figure 3 or the edges thereof beveled and the holes are arranged in staggered rows corresponding to the deepest portion of the indentations 3 and the summits of projections 2. The holder is thickened adjacent either end as at 10 and 11 to prevent sharp bends in the leader as it is wound on and off the holder.

In operation a loop 7 of a leader 8 is caught over one of projections 2 as shown in Figure 1 and the leader is wound around holder 1 as shown until it is possible to insert the hook 9 into one of the holes 4. As shown in Figure 2, the hook is inserted through the hole and the natural elasticity of the leader prevents the hook from becoming dislodged from the hole because the curve of the hook is held against the edge of the hole by tension of the leader. It will be noted from Figures 2, 3 and 4 that it is, however, convenient to remove the hook from the hole because of the beveled edges of the holes. If the edges of the holes were not beveled the hook would catch against the sharp edge of the hole and the hook could not then be removed from the hole. Furthermore, by beveling the edges of the holes, a larger hook may be inserted.

The shape of holder 1 is preferably that of a regular trapezoid, that is, a truncated wedge. However, this shape may be varied somewhat provided that the wrapping or transverse dimensions of the holder varies from indentation to indentation. The purpose served by this variation in transverse dimension is that in case the length of the leader turns out to be an integral multiple of the transverse dimension of the holder at the particular point where wrapping is attempted and the hook does not fall opposite any hole but would extend over the edge of the holder, the wrapping may be tried at another location where the transverse dimension is either shorter or longer so that the hook may be secured to one of the holes.

There is thus provided means for storing and carrying fish hooks and flies when attached to leaders. A great variety of such devices may be carried on a single holder offering great flexibility to the activities of the fishermen. The device has the further advantage of being easily fabricated inasmuch as the entire one piece device may be injection molded from a plastic material. In addition the leaders may be removed easily and quickly and without tangling.

Although the invention has been described and illustrated in detail, it is to be understood that the same is by way of illustration only and that the spirit and scope of the invention is to be limited only by the terms of the appended claims.

I claim:

1. A snell holder comprising a trapezoidal plate of plastic material having a plurality of projections and indentations alternating on opposing non-parallel edges thereof and a plurality of countersunk holes therethrough whereby the loop of the snell may be secured over one of said projections, the snell may be wrapped around said holder in said indentations and a hook on said snell may be engaged in one of said holes.

2. An improved leader holder comprising a trapezoidal plate of plastic material having two opposing non-parallel edges with alternating indentations and projections thereon and a plurality of holes therethrough arranged in rows between projections and being countersunk on both surfaces of said holder.

3. An improved leader holder comprising a trapezoidal plastic plate having a plurality of substantially sinusoidal serrations forming a series of projections on opposing non-parallel edges thereof for securing the looped end of said leader and a plurality of rows of holes therethrough, the rows being disposed between the corresponding projections of said sinusoidal serrations, said holes in said rows being staggered from row to row and said holes having beveled edges whereby if a leader is looped over one of the projections of said sinusoidal serrations and wrapped around said holder in a zone defined by the indentations of said sinusoidal serrations, the hook at the opposite end of said leader may be inserted and removed expeditiously from one of said holes.

References Cited in the file of this patent

UNITED STATES PATENTS

| | | |
|---|---|---|
| 2,164,259 | Schweigert | June 27, 1939 |
| 2,287,368 | Anderson | June 23, 1942 |
| 2,431,821 | Murph | Dec. 2, 1947 |
| 2,493,344 | Hamel | Jan. 3, 1950 |
| 2,555,815 | Rawlins et al. | June 5, 1951 |
| 2,595,463 | Kamps | May 6, 1952 |
| 2,597,304 | Dillingham | May 20, 1952 |

FOREIGN PATENTS

| | | |
|---|---|---|
| 125,857 | Australia | Nov. 6, 1947 |